United States Patent
Oya et al.

(10) Patent No.: US 8,494,893 B2
(45) Date of Patent: Jul. 23, 2013

(54) PRODUCTION PLAN MAKING PROGRAM, DEVICE, AND METHOD

(75) Inventors: Kenji Oya, Fujisawa (JP); Kenichi Funaki, Tokyo (JP); Hiroyuki Konno, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 13/058,588

(22) PCT Filed: Jun. 12, 2009

(86) PCT No.: PCT/JP2009/060794
§ 371 (c)(1),
(2), (4) Date: May 4, 2011

(87) PCT Pub. No.: WO2010/018709
PCT Pub. Date: Feb. 18, 2010

(65) Prior Publication Data
US 2011/0208555 A1   Aug. 25, 2011

(30) Foreign Application Priority Data

Aug. 12, 2008   (JP) .................................. 2008-208004

(51) Int. Cl.
*G06Q 10/00*   (2012.01)
(52) U.S. Cl.
USPC ....................................................... 705/7.26
(58) Field of Classification Search
USPC .......................................................... 705/7.26
See application file for complete search history.

(56) References Cited

U.S. PATENT DOCUMENTS

| | | | | |
|---|---|---|---|---|
| 5,479,343 | A | * | 12/1995 | Matoba et al. ................. 700/106 |
| 5,630,070 | A | * | 5/1997 | Dietrich et al. .............. 705/7.23 |
| 6,049,774 | A | * | 4/2000 | Roy .............................. 705/7.22 |
| 6,701,201 | B2 | * | 3/2004 | Hegde et al. .................. 700/107 |
| 7,006,885 | B2 | * | 2/2006 | Chen ............................. 700/102 |
| 7,346,534 | B1 | * | 3/2008 | Martin et al. ................ 705/7.22 |
| 7,383,337 | B2 | * | 6/2008 | Denton et al. ................ 709/226 |
| 7,590,461 | B2 | * | 9/2009 | Milne et al. ..................... 700/95 |
| 7,617,015 | B2 | * | 11/2009 | Steinbach et al. .............. 700/97 |
| 7,668,761 | B2 | * | 2/2010 | Jenkins et al. .................. 705/28 |
| 7,774,225 | B2 | * | 8/2010 | Cargille et al. .............. 705/7.25 |

(Continued)

FOREIGN PATENT DOCUMENTS

| | | |
|---|---|---|
| JP | 08-077259 | 3/1996 |
| JP | 10-080842 | 3/1998 |
| JP | 11-320344 | 11/1999 |
| JP | 2003-044117 | 2/2003 |

OTHER PUBLICATIONS

Ho, Johnny C., Yih-Long, Chang, and Tzu-Liang, Tseng (Bill), "Heuristics for Scheduling Operations in MRP: Flowshop Case," Academy of Information and Management Sciences Journal, 9, 2, 2006, pp. 111-129.*

*Primary Examiner* — Nathan Erb
(74) *Attorney, Agent, or Firm* — Antonelli, Terry, Stout & Kraus, LLP.

(57) ABSTRACT

A production plan enabling suppression of occurrence of excess stock is made. A shipping request representing the requested amount of shipping for each shipping request week is received. Among the shipping weeks of the shipping requests, the furthest future shipping request week is handled as the furthest future shipping week, and the amounts of shipping of shipping weeks near the present time are determined sequentially from the amount of shipping of the furthest future shipping week.

5 Claims, 15 Drawing Sheets

U.S. PATENT DOCUMENTS

| | | |
|---|---|---|
| 7,856,287 B2 * | 12/2010 | Milne et al. .................... 700/100 |
| 7,937,475 B2 * | 5/2011 | Denton et al. ................. 709/226 |
| 7,941,236 B2 * | 5/2011 | Spearman ....................... 700/95 |
| 7,974,720 B2 * | 7/2011 | Kowalewski .................... 700/97 |
| 2002/0087227 A1 * | 7/2002 | Tozawa et al. .................. 700/95 |
| 2002/0188499 A1 * | 12/2002 | Jenkins et al. ................... 705/10 |
| 2003/0050818 A1 * | 3/2003 | Maie et al. ......................... 705/8 |
| 2003/0065415 A1 * | 4/2003 | Hegde et al. .................. 700/100 |
| 2003/0171963 A1 * | 9/2003 | Kurihara et al. ................... 705/7 |
| 2004/0030428 A1 * | 2/2004 | Crampton et al. ............ 700/101 |
| 2004/0260419 A1 * | 12/2004 | Chen ............................. 700/102 |
| 2005/0015167 A1 * | 1/2005 | Searcy et al. ................. 700/100 |
| 2005/0065833 A1 * | 3/2005 | Okaji et al. ........................ 705/8 |
| 2005/0171786 A1 * | 8/2005 | Denton et al. ..................... 705/1 |
| 2005/0234579 A1 * | 10/2005 | Asmundsson et al. ......... 700/102 |
| 2007/0185776 A1 * | 8/2007 | Nguyen et al. .................. 705/26 |
| 2007/0239299 A1 * | 10/2007 | Milne et al. .................... 700/100 |
| 2008/0015721 A1 * | 1/2008 | Spearman ....................... 700/99 |
| 2008/0080006 A1 * | 4/2008 | Paskalev et al. ............. 358/1.18 |
| 2008/0154660 A1 * | 6/2008 | Steinbach et al. ................. 705/7 |
| 2008/0221962 A1 * | 9/2008 | Denton et al. ..................... 705/8 |
| 2009/0219575 A1 * | 9/2009 | Paskalev et al. ............. 358/1.15 |
| 2009/0228128 A1 * | 9/2009 | Milne et al. .................... 700/101 |
| 2010/0042240 A1 * | 2/2010 | Kowalewski .................... 700/97 |
| 2011/0208555 A1 * | 8/2011 | Oya et al. .................... 705/7.12 |
| 2011/0230994 A1 * | 9/2011 | Spearman ....................... 700/99 |

\* cited by examiner

FIG. 2

PRODUCTION CAPACITY TL 131

| PRODUCTION LINE NAME | WEEK NUMBER | PRODUCTION CAPACITY |
|---|---|---|
| L1 | 1 | 1,500 |
| L1 | 2 | 1,500 |
| L1 | 3 | 1,500 |
| L1 | 4 | 1,600 |
| L1 | 5 | 1,700 |
| ... | ... | ... |
| L2 | 1 | 1,500 |
| L2 | 2 | 1,500 |
| L2 | 3 | 1,500 |
| L2 | 4 | 1,500 |
| L2 | 5 | 1,500 |
| ... | ... | ... |
| 131a | 131b | 131c |

FIG. 3

SHIPPING REQUEST INFORMATION TL 132

| ITEM NAME | DESTINATION | SHIPPING REQUEST WEEK NUMBER | SHIPPING REQUEST AMOUNT |
|---|---|---|---|
| AAA | X | 1 | 500 |
| AAA | X | 2 | 600 |
| AAA | X | 3 | 700 |
| ... | ... | ... | ... |
| AAA | X | 24 | 300 |
| ... | ... | ... | ... |
| AAA | Y | 1 | 400 |
| AAA | Y | 2 | 400 |
| AAA | Y | 3 | 300 |
| ... | ... | ... | ... |
| AAA | Y | 24 | 100 |
| ... | ... | ... | ... |
| BBB | X | 1 | 200 |
| BBB | X | 2 | 200 |
| BBB | X | 3 | 400 |
| ... | ... | ... | ... |
| BBB | X | 24 | 100 |
| ... | ... | ... | ... |
| BBB | Y | 1 | 300 |
| BBB | Y | 2 | 200 |
| BBB | Y | 3 | 100 |
| ... | ... | ... | ... |
| BBB | Y | 24 | 300 |
| ... | ... | ... | ... |

PRODUCTION LINE SETTING TL 133

| ITEM NAME | PRODUCTION LINE NAME | PRODUCTION CAPACITY CONSUMPTION FACTOR |
|---|---|---|
| AAA | L1 | 1.0 |
| BBB | L1 | 1.0 |
| CCC | L2 | 1.0 |
| DDD | L2 | 1.2 |
| ... | ... | ... |

TRANSPORTATION TIME TL 134

| PRODUCTION LINE NAME | DESTINATION | TRANSPORTATION TIME (WEEK) |
|---|---|---|
| L1 | X | 0 |
| L1 | Y | 2 |
| L1 | Z | 5 |
| ... | ... | ... |
| L2 | X | 1 |
| L2 | Y | 2 |
| L2 | Z | 5 |
| ... | ... | ... |

ALLOCATION RESULT TL 135

| ITEM NAME | PRODUCTION LINE NAME | DESTINATION | TRANSPORTATION TIME | SHIPPING REQUEST WEEK NUMBER | SHIPPING MARGIN TIME | DEMAND CERTAINTY | SHIPPING WEEK NUMBER | ALLOCATED AMOUNT |
|---|---|---|---|---|---|---|---|---|
| ... | ... | ... | ... | ... | ... | ... | ... | ... |
| AAA | L1 | Y | 2 | n | 0 | 2 | n | 500 |
| BBB | L1 | Y | 2 | n | 0 | 2 | n | 350 |
| BBB | L1 | X | 0 | n+1 | 1 | 1 | n | 100 |
| BBB | L1 | X | 0 | n | 0 | 0 | n | 350 |
| ... | ... | ... | ... | ... | ... | ... | ... | ... |
| 135a | 135b | 135c | 135d | 135e | 135f | 135g | 135h | 135i |

FIG. 7

ALLOCATION WORK TL 121

| ITEM NAME | PRODUCTION LINE NAME | PRODUCTION CAPACITY CONSUMPTION FACTOR | DESTINATION | TRANSPORTATION TIME | SHIPPING REQUEST WEEK NUMBER | SHIPPING MARGIN TIME | DEMAND CERTAINTY | SHIPPING REQUIREMENT AMOUNT | ALLOCATION ORDER | UNALLOCATED AMOUNT |
|---|---|---|---|---|---|---|---|---|---|---|
| BBB | L1 | 1.0 | X | 0 | n+1 | 1 | 1 | 100 | 3 | 100→0 |
| AAA | L1 | 1.0 | Y | 2 | n | 0 | 2 | 500 | 1 | 500→0 |
| BBB | L1 | 1.0 | Y | 2 | n | 0 | 2 | 350 | 2 | 350→0 |
| AAA | L1 | 1.0 | X | 0 | n | 0 | 0 | 400 | 5 | 400→400 |
| BBB | L1 | 1.0 | X | 0 | n | 0 | 0 | 500 | 4 | 500→150 |
| ... | ... | ... | ... | ... | ... | ... | ... | ... | ... | ... |
| 121a | 121b | 121c | 121d | 121e | 121f | 121g | 121h | 121i | 121j | 121k |

FIG. 8

REMAINING PRODUCTION CAPACITY TL 122

| PRODUCTION LINE NAME | WEEK NUMBER | PRODUCTION CAPACITY | REMAINING PRODUCTION CAPACITY |
|---|---|---|---|
| L1 | n | 1,300 | 1,300 |
| L2 | n | 1,000 | 1,000 |
| ... | ... | ... | ... |

122a  122b  122c  122d

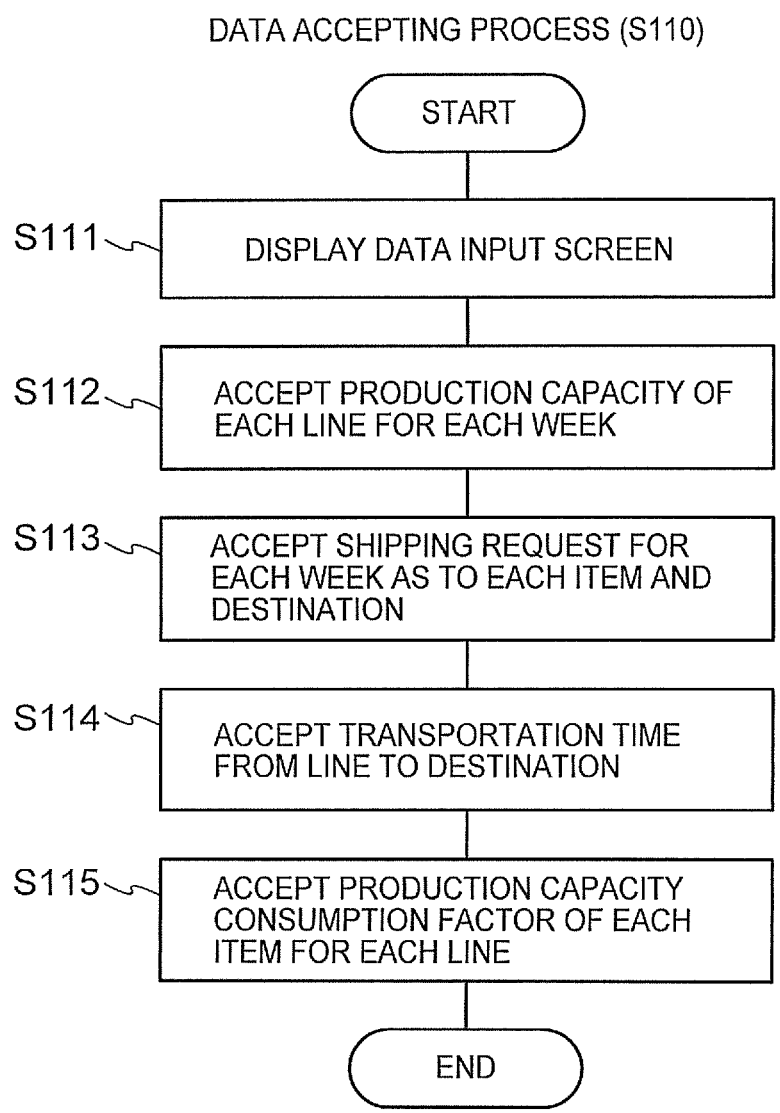

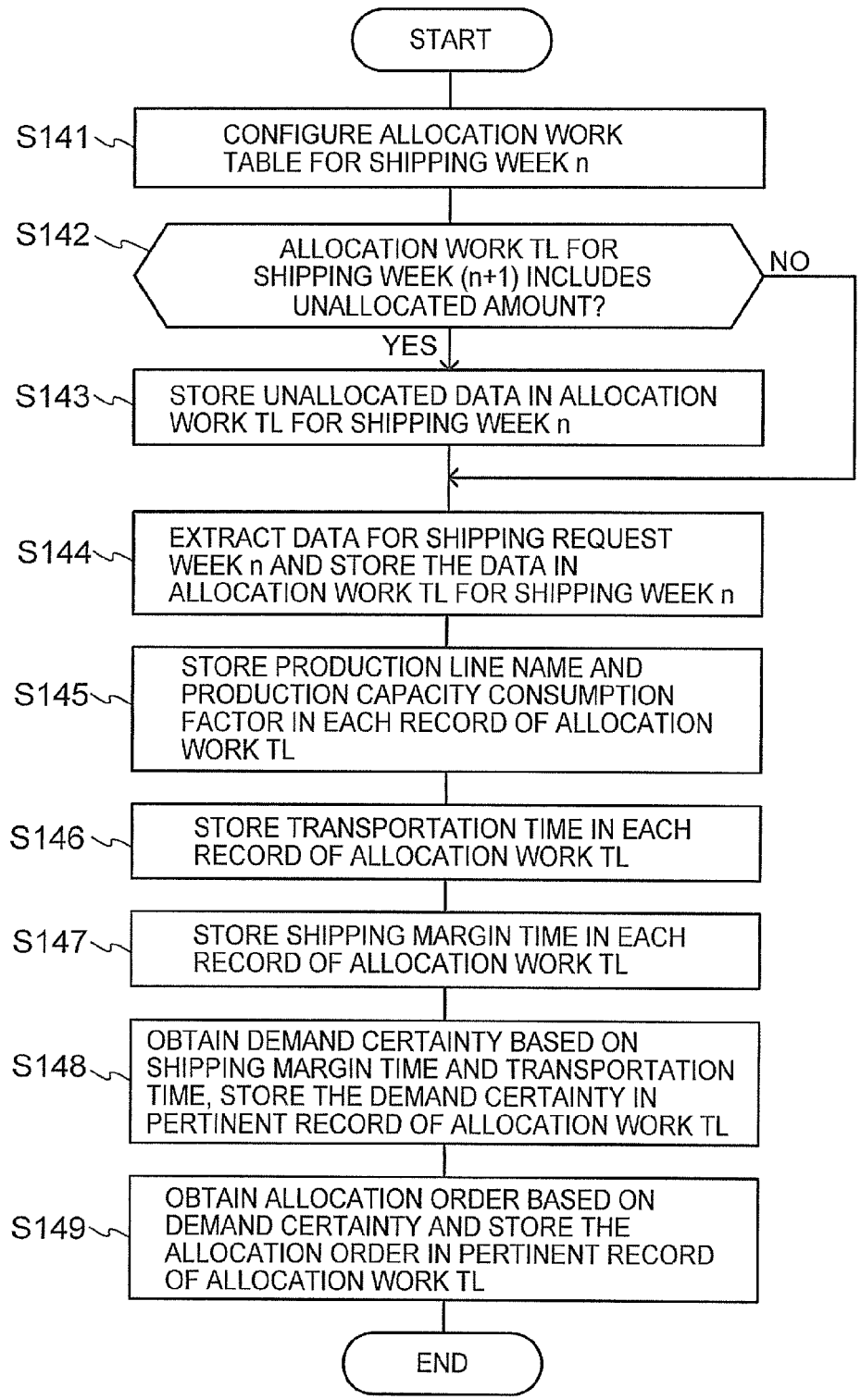

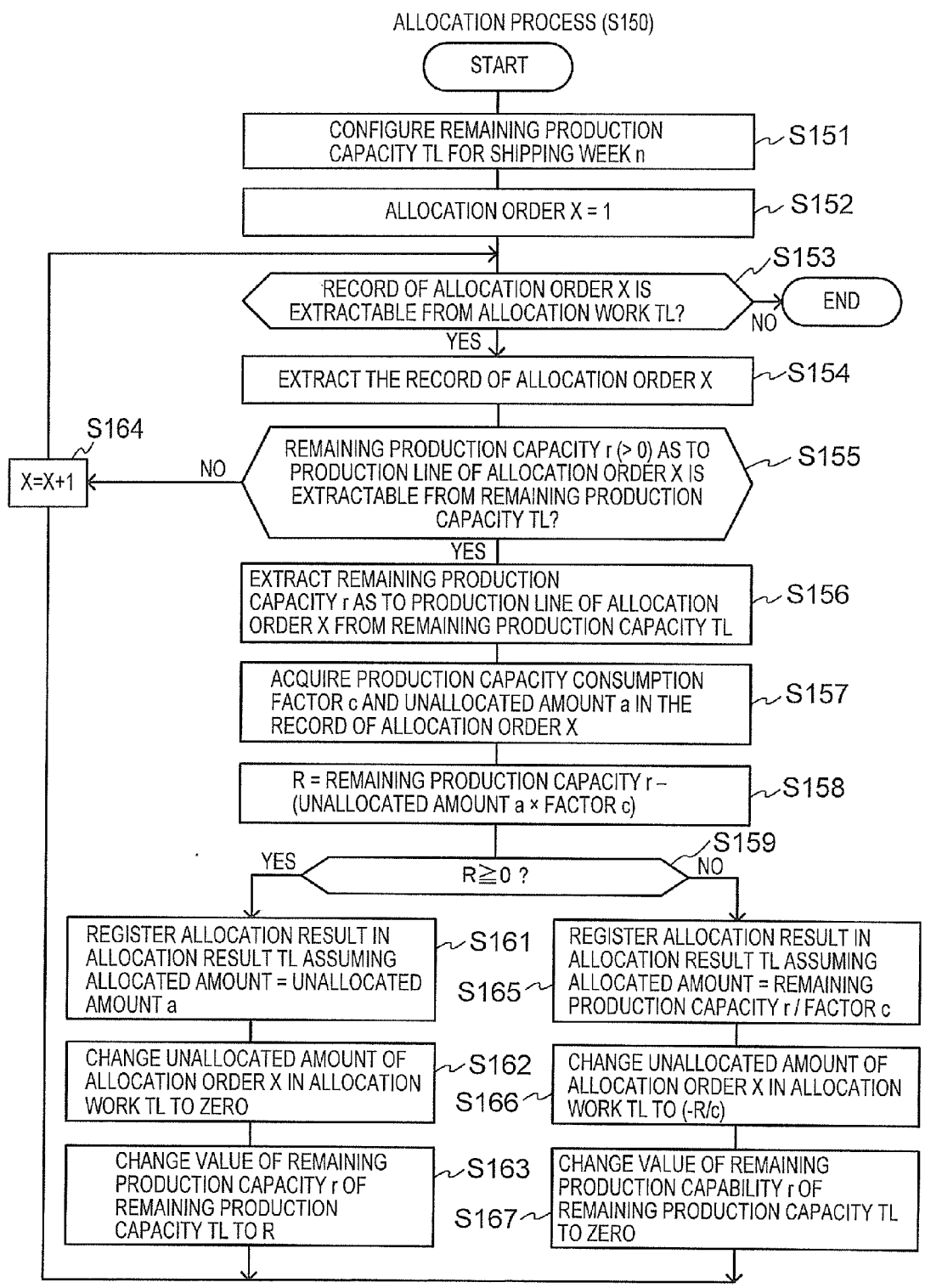

FIG. 13

PRODUCTION CAPACITY INFORMATION

| PRODUCTION LINE NAME | 1 | 2 | 3 | ... |
|---|---|---|---|---|
| L1 | 1500 | 1500 | 1500 | ... |
| L2 | 300 | 200 | 100 | ... |
| ... | ... | ... | ... | ... |

[REGISTER] 144a

SHIPPING REQUEST INFORMATION

| ITEM NAME | DESTINATION | 1 | 2 | 3 | ... |
|---|---|---|---|---|---|
| AAA | X | 500 | 600 | 700 | ... |
| BBB | X | 200 | 200 | 400 | ... |
| ... | ... | ... | ... | ... | ... |
| AAA | Y | 400 | 400 | 300 | ... |
| BBB | Y | 300 | 200 | 100 | ... |
| ... | ... | ... | ... | ... | ... |

[REGISTER] 145a

PRODUCTION LINE SETTING INFORMATION

| ITEM NAME | PRODUCTION LINE NAME | PRODUCTION CAPACITY CONSUMPTION FACTOR | |
|---|---|---|---|
| AAA | L1 | 1.0 | [DELETE] |
| BBB | L1 | 1.0 | [DELETE] |
| CCC | L2 | 1.0 | [DELETE] |
| DDD | L2 | 1.2 | [DELETE] |

[REGISTER] 146a
[ADD]

TRANSPORTATION TIME INFORMATION

| PRODUCTION LINE NAME | DESTINATION | TRANSPORTATION TIME (WEEK) | |
|---|---|---|---|
| L1 | X | 0 | [DELETE] |
| L1 | Y | 2 | [DELETE] |
| L1 | Z | 5 | [DELETE] |
| ... | ... | ... | |
| L2 | X | 1 | [DELETE] |
| L2 | Y | 2 | [DELETE] |
| L2 | Z | 5 | [DELETE] |

[REGISTER] 147a
[ADD]

FIG. 14

| PRODUCTION LINE NAME | ITEM NAME | 1 | 2 | 3 | ... | 24 |
|---|---|---|---|---|---|---|
| L1 | AAA | 900 | 1000 | 1000 | ... | 400 |
|  | BBB | 500 | 400 | 500 | ... | 200 |
| ... | ... | ... | ... | ... | ... | ... |
| L2 | CCC | 150 | 150 | 50 | ... | 100 |
|  | DDD | 100 | 50 | 50 | ... | 100 |
| ... | ... | ... | ... | ... | ... | ... |

PRODUCTION PLAN 148, 148a, 148b, 148c

PRODUCTION PLAN MAKING PROGRAM, DEVICE, AND METHOD

TECHNICAL FIELD

The present invention relates to a planning technique for making a production plan that determines shipment time of a product.

BACKGROUND ART

In most cases, a manufacturer who produces and distributes a product makes a production plan on the basis of a distant future shipment plan that is preliminarily formed by the sales side, and accordingly actual production is carried out. Ideally, if all of requested amount is produced just before shipment and sales, followed by actual shipment and sales, it is possible to avoid opportunity loss due to emergence of shortage, and occurrence of surplus stocks. In a real field, however, production is made earlier than a scheduled shipment time, inmost cases, taking production capacity and transportation lead time into account. In particular, according to market globalization of recent years, exports from one base to worldwide markets are increasing, and it becomes more and more important to contrive how a production is made advance in time, in order to export a right amount at a right timing to each location.

It is effective to begin production advance in time to avoid being out of stock due to deficiency in supply. However, there is a hidden possibility that if a shipment plan of the product already manufactured is downwardly revised because of market trend change, the product already manufactured will be built up as surplus stocks.

In view of the situation above, the technique described in the following patent document 1 makes a production plan considering demand certainty, thereby avoiding out-of-stock state, and simultaneously preventing the probability of surplus stock occurrence. Specifically, in the patent document 1, priorities are assigned to each of sales sources, and high priority is placed on demand information from the sales source to which high priority is assigned, and a production plan is made accordingly.

PRIOR ART DOCUMENT

Patent Document

[Patent Document 1]
Japanese Unexamined Patent Application Publication No. 2003-044117

SUMMARY OF THE INVENTION

Problem to be Solved by the Invention

According to the technique described in the patent document 1, it is true to prevent the probability of surplus stock occurrence, but manufacturers are demanding a technique which drastically reduces the probability of surplus stock occurrence.

Given this situation, an object of the present invention is to provide a technique which allows drastic reduction of the probability of surplus stock occurrence.

Means to Solve the Problem

In order to solve the problem above, the present invention is directed to the following procedure, when it is determined in which unit period (hereinafter referred to as "shipping period") a product is shipped, in response to a shipping request indicating a requested shipping amount from each destination for each unit period of a product (hereinafter, referred to as "shipping request period"), i.e., according to the present invention, the shipping request of the product from each destination, production capacity of the product during the unit period, and a product transportation time up to the destination with respect to each destination are accepted, and each data is stored in a storage means of a computer. Next, the furthest future shipping request period is specified, out of the shipping request periods of the shipping requests being stored in the storage means of the computer. Next, the furthest future shipping request period is assumed as the furthest future shipping period, and a shipping amount for each shipping period is determined starting from the shipping amount in the furthest future shipping period, followed by determining the shipping amount in the shipping periods each sequentially approaching the current time. Then, the shipping amount being determined for each shipping period is outputted from an output means of the computer.

When the shipping amount for each shipping period is determined in the present invention, firstly, an order setting time is determined for the shipping period targeted for setting the shipping amount, the order setting time indicating the time from the shipping period until the product is delivered to the destination, referring to a product transportation time to each destination stored in the storage means, as to each shipping request from the destination awaiting shipment, among the shipping requests whose shipping request period is in the shipping period or later than the shipping period. Next, the order setting time for each shipping request awaiting shipment is referred to, and an allocation order for each shipping request awaiting shipment is determined in such a manner that the allocation order of the shipping request is made higher as the order setting time becomes longer. Then, according to the allocation order thus determined, the requested shipping amount for each shipping request awaiting shipment is sequentially allocated to the shipping period, and in the case where an aggregate allocated shipping amount in the shipping period goes over the production capacity of the shipping period, excess amount over the production capacity is set as awaiting shipment, and consequently, the shipping amount in this shipping period is determined.

It is to be noted here that the unit period may be assumed, for example, as one day, one week, ten days, two weeks, one month, or the like.

Effect of the Invention

In the present invention, as to each shipping request, demand certainty is determined based on the transportation time and the like, the allocation order for the demand of far future with low certainty is set to be higher, and the allocation order for the demand of near future with high certainty is set to be lower. Then, when the shipping amount is determined starting from the far future shipping period, as for a shipping request with a low allocation order, that is, the shipping request with high demand certainty, the shipping period is determined at a later stage as possible, in other words, the shipping period is brought to forward in time. On the other hand, as for a shipping request with low demand certainty, the shipping period is relatively made to be delayed. Consequently, according to the present invention, as for the shipping request with high demand certainty, it is possible to produce a product early and surely, whereas production is performed delayed till later, as for the shipping request with low demand certainty. Therefore, the probability of surplus stock occurrence may be prevented.

BRIEF DESCRIPTION OF DRAWINGS

FIG. 2 illustrates a data configuration of a production capacity table in one embodiment relating to the present invention;

FIG. 3 illustrates a data configuration of a shipping request information table in one embodiment relating to the present invention;

FIG. 4 illustrates a data configuration of a production line setting table in one embodiment relating to the present invention;

FIG. 5 illustrates a data configuration of a transportation time table in one embodiment relating to the present invention;

FIG. 6 illustrates a data configuration of an allocation result table in one embodiment relating to the present invention;

FIG. 7 illustrates a data configuration of an allocation work table in one embodiment relating to the present invention;

FIG. 8 illustrates a data configuration of a remaining production capacity table in one embodiment relating to the present invention;

FIG. 10 is a flowchart showing details of data accepting process (S110) in the flowchart as shown in FIG. 9;

FIG. 11 is a flowchart showing details of allocation order setting process (S140) in the flowchart as shown in FIG. 9;

FIG. 12 is a flowchart showing details of allocation process (S150) in the flowchart as shown in FIG. 9;

FIG. 13 illustrates a data entry screen in one embodiment relating to the present invention;

FIG. 14 illustrates a production plan screen in one embodiment relating to the present invention.

BEST MODE FOR CARRYING OUT THE INVENTION

Hereinafter, one embodiment of the production plan making device relating to the present invention will be explained with reference to the accompanying drawings.

The production plan making device of the present embodiment is a computer to form a production plan that determines a shipping amount per week, based on a shipping request from a destination that is a destination to which various products are shipped.

Figure 1:
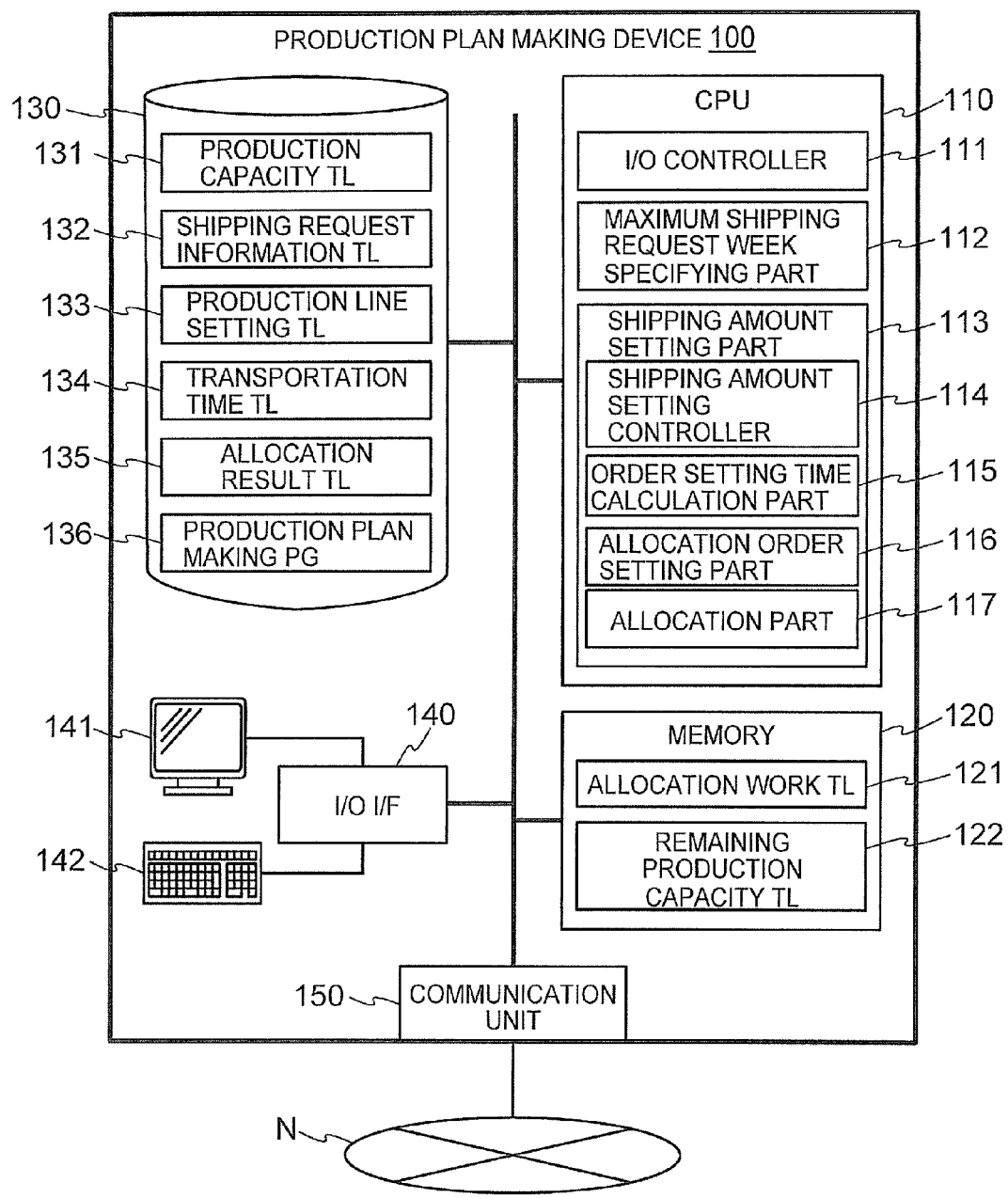
FIG. 1 is a block diagram of a production plan making device in one embodiment relating to the present invention.

As shown in FIG. 1, the production plan making device 100 of the present embodiment incorporates a CPU 110 for carrying out various computations, a memory 120 being a work area of the CPU 110, a storage unit 130 such as a hard disk drive unit, a display unit 141, an input unit 142 such as a keyboard and a mouse, an I/O interface 140 being an interface with the display unit 141 and the input unit 142, and a communication unit 150 for communicating with other device via the network N.

The storage unit 130 stores a production plan making program 136 in advance. Multiple tables 131 to 135 are configured in the storage unit 130 in the process of executing the production plan making program 136. Also in the memory 120, there are configured multiple tables 121 and 122 in the process of executing the production plan making program 136. Data configuration of each of the tables 131 to 135, 121, and 122 will be described later in the case where each table is configured, or in the similar case.

The CPU 110 functionally incorporates an I/O controller 111 for performing control such as input control of the input unit 142 and display control of the display unit 141, a maximum shipping request week specifying part 112 for specifying a maximum shipping request week, out of the shipping request weeks requested from the destination being a destination to which a product is shipped, and a shipping amount setting part 113 for deciding a shipping amount in each week. The shipping amount setting part 113 includes an allocation part 117 for allocating the shipping request from each destination to each week, an allocation order setting part 116 for determining an allocation order for performing this allocation, an order setting time calculation part 115 for calculating an order setting time based on which the allocation order is determined, and a shipping amount setting controller 114 for controlling those parts described above. Any of the functional parts 111 to 117 functions when the CPU 110 executes the production plan making program 136 that is stored in the storage unit 130.

Next, according to the flowcharts as shown in FIG. 9 to FIG. 12, operations of the production plan making device 100 of the present embodiment will be explained.

Figure 9:
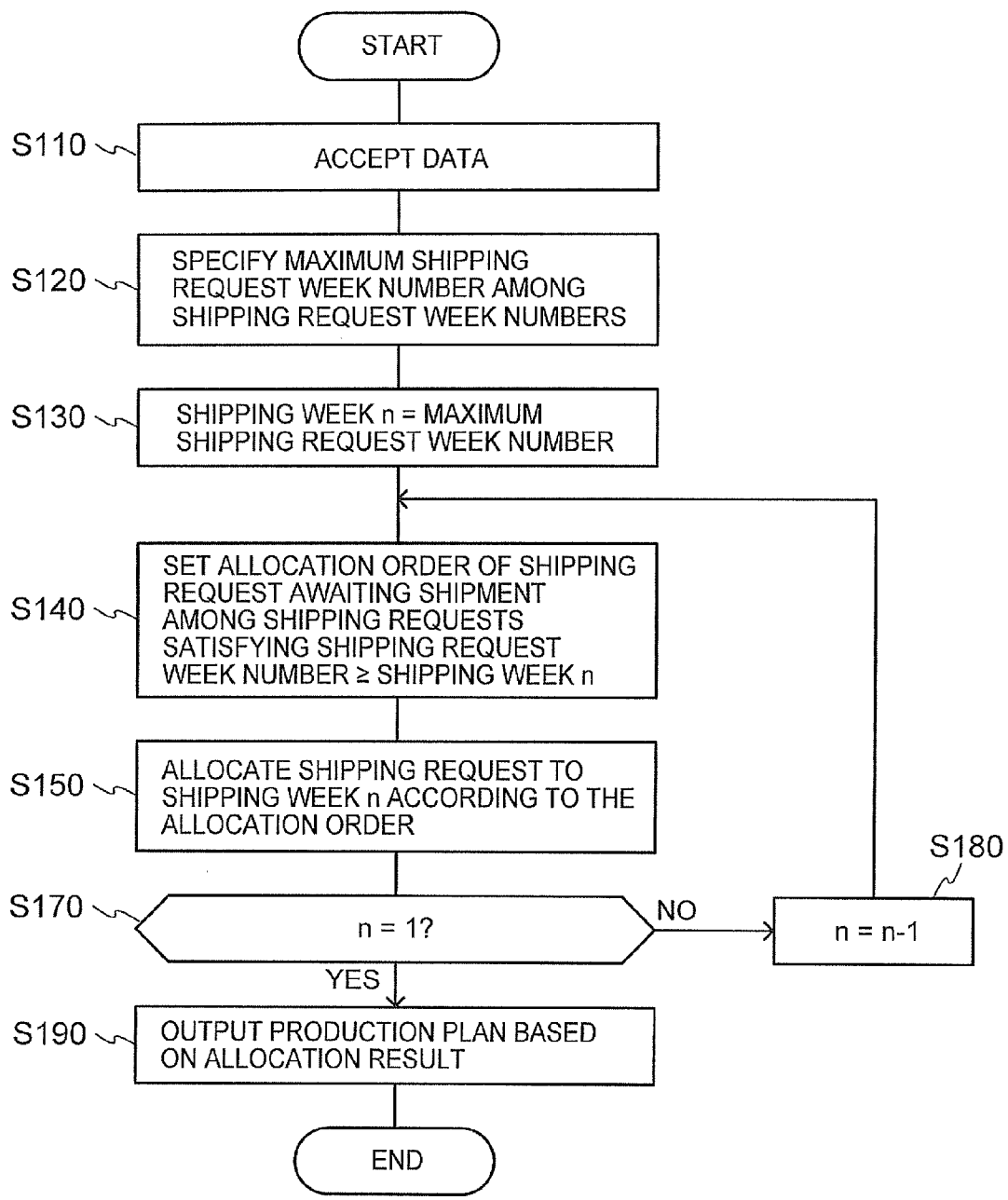
FIG. 9 is a flowchart showing an operation of the production plan making device in one embodiment relating to the present invention.

As shown in FIG. 9, firstly, the I/O controller 111 accepts various data and stores the data in the storage unit 130 (S110).

Here, with reference to the flowchart as shown in FIG. 10, details of the process for accepting data (S110) will be explained.

Firstly, according to a directive from an operator, the I/O controller 111 displays a data entry screen 143 as shown in FIG. 13 on the display unit 141 (S111). This data entry screen 143 displays a production capacity information field 144 for entering the production capacity of each production line, a shipping request information field 145 for entering a shipping request from each destination, a production line setting information field 146 for entering a relationship between each item and each production line, and a production capacity consumption factor of each item with respect to each production line, a transportation time information field 147 for entering a transportation time (unit of week) of a product from each production line to each destination, and further registration buttons 144a to 147a to register data entered respectively in the information fields 144 to 147.

With the data entry screen 143, the operator enters data in each of the information fields 144 to 147, and then presses the registration buttons 144a to 147a. Accordingly, the I/O controller 111 of the production plan making device 100 accepts data sequentially, and stores the data in the storage unit 130 (S112 to S115).

Specifically, the I/O controller 111 accepts production capacity information indicating the production capacity of each production line for each week, generates a production capacity table 131 based on the accepted production capacity information, and stores the table in the storage unit 130 (S112). As shown in FIG. 2, this production capacity table 131 includes a production line name field 131a for storing a production line name, a week number field 131b for storing a week number, and a production capacity field 131c for storing a maximum production size of the pertinent week in the pertinent production line, i.e., production capacity. It is to be noted that in FIG. 2, the production capacity is increased in the week numbers "3" and "4" for the production line name "L1", indicating that the production line with the name "L1" is expanded in the week numbers "3" and "4".

The I/O controller 111 accepts shipping request information indicating the shipping amount of each item for each week with respect to each destination, generates a shipping request information table 132 based on the shipping request information, and stores the table in the storage unit 130 (S113). As shown in FIG. 3, the shipping request information table 132 includes an item name field 132a for storing the item name of the product, a destination field 132b for storing the destination, a shipping request week number field 132c for storing the shipping request week number, and a requested shipping amount field 132d for storing the requested shipping amount.

The I/O controller 111 accepts transportation time information indicating the transportation time of a product from each production line to each destination, generates a transportation time table 134 based on this information, and stores the table in the storage unit 130 (S114). As shown in FIG. 5, the transportation time table 134 includes a production line name field 134a for storing the production line name, a destination field 134b for storing the destination, and a transportation time field 134c for storing the time to deliver a product from the pertinent production line to the pertinent destination, i.e., transportation time (unit of week).

Furthermore, the I/O controller 111 accepts production line setting information indicating each item, the production line for producing each item, and a production capacity consumption factor of the item in this production line, generates a production line setting table 133 based on this information, and stores the table in the storage unit 130. The production capacity consumption factor is a value indicating how many reference item products can be produced every time when one target item product is produced, in one particular production line. By way of example, in the case where 100 units of the target item product can be produced during a unit period in a certain production line, and 120 units of the reference item product can be produced during the unit period in this production line, the production capacity consumption factor of the target item product in the production line is calculated as 120 (the amount of production of the reference item)/100 (the amount of production of the target item)=1.2. It is to be noted that the production capacity of each production line accepted in the aforementioned step 112 corresponds to the production capacity relating to the reference item product in the production line. Therefore, the production capacity stored in the production capacity field 131c of the production capacity table 131 also indicates the production capacity relating to the reference item product in the pertinent production line. As shown in FIG. 4, the production line setting table 133 includes an item name field 133a for storing the item name, a production line name field 133b for storing the production line name, and a production capacity consumption factor field 133c for storing the production capacity consumption factor.

This is the end of the data accepting process (S110).

It is to be noted that the order for accepting data in the steps from the step 112 to the step 115 is not necessarily the order as described above. Furthermore, it is not necessary to enter the above data items at a time, but each of them may be separately entered on several times, before the device 100 starts generating the production plan by using those data items. In here, explanation is made assuming that the accepted data is delivered from the input unit 141, but it goes without saying that it may be the data received via the network N, and the data read from a portable storage medium.

Moreover, the I/O controller 111 serving as the data accepting means accepts data passively from the outside, but the data accepting means may actively extract necessary data from an outside data source.

When the data accepting process (S110) ends, as illustrated by the flowchart shown in FIG. 9, the maximum shipping request week specifying part 112 refers to the shipping request information table 132, and specifies the furthest future week out of the shipping request weeks, i.e., the maximum shipping request week number in the shipping request week numbers (S120). By way of example, in the example of the shipping request information table 132 as shown FIG. 3, the maximum shipping request number "24" is specified in the shipping request week number field 132c.

Next, the shipping week n, as to which the shipping amount setting controller 114 in the shipping amount setting part 113 determines the shipping amount from now, is assumed as the maximum shipping request week number (S130).

Next, an allocation order setting part 116 in the shipping amount setting part 113 determines an order of shipment allocation in the shipping week n, for the shipping request awaiting shipment out of the shipping requests with the shipping request week number equal to or more than the shipping week n as to which the shipping amount is determined from now (S140). This allocation order is determined based on the order setting time which is obtained by the order setting time calculation part 115. It is to be noted that the allocation order setting process (S140) will be explained later in detail.

Next, the allocation part 117 in the shipping amount setting part 113 allocates to the shipping week n, the shipping amount for each shipping request awaiting shipment, on the basis of the aforementioned allocation order (S150). In other words, this determines the shipping amount in the shipping week n. While the allocation process is performed, if an aggregate shipping amount in the shipping week n goes over the production capacity of the production line, the excess amount is assumed as awaiting shipment, and allocation is made by the allocation process relating to the shipping week on or before the shipping week (n−1). It is to be noted that this allocation process (S150) will also be explained later in detail.

When the allocation process (S150) is completed, the shipping amount setting controller 114 determines whether or not n is equal to 1, in other words, the shipping week corresponds to the week to be subjected to the last process, the week being the closest to the present time (S170). If n is not equal to 1, the shipping amount setting controller 114 assumes (n−1) as a new shipping week, and the processing returns to the step 140.

The above processes from the step 140 to the step 180 are repeated, and when it is determined in the step 170 that n is equal to 1, it is assumed that setting of shipping amount for all the weeks is completed, and the processing proceeds to the step 190. In the step 190, the I/O controller 111 outputs a production plan based on the allocation result of each week (S190), and terminates a series of the processes.

Next, according to the flowchart as shown in FIG. 11, the aforementioned allocation order setting process (S140) will be explained in detail.

Firstly, the allocation order setting part 116 of the shipping amount setting part 113 configures on the memory 120, an allocation work table 121 of the shipping week n that is determined in the step 130 or in the step 180 in FIG. 9 (S141). As shown in FIG. 7, the allocation work table 121 includes an item name field 121a for storing the item name, a production line name field 121b for storing the production line name, a production capacity consumption factor field 121c for storing the production capacity consumption factor, a destination field 121*d* for storing the destination, a transportation time field 121*e* for storing the transportation time to the destination, a shipping request week number field 121*f* for storing the shipping request week number, a shipping margin time field 121*g* for storing shipping margin time, a demand certainty field 121*h* for storing demand certainty, a shipping requirement amount field 121*i* for storing shipping requirement amount, an allocation order field 121*j* for storing the allocation order of shipping request to the shipping week n, an unallocated amount field 121*k* for storing a portion of unallocated amount in the requested shipping amount.

Next, the allocation order setting part 116 determines whether or not there is a record in which the unallocated amount field 121*k* in the allocation work table 121 is not "zero", the table being associated with the shipping week (n+1) as to which the allocation order setting process (S140) and the allocation process (S150) have already been performed, in other words, whether or not there is a record in which unallocated portion exists in the allocation work table 121, in association with the shipping week (n+1) (S142). If there is no record which has not been allocated yet, the processing proceeds to the step 144, whereas if there is any record to be subjected to the allocation, the processing proceeds to the step 143. It is to be noted that in the case where the shipping week n corresponds to the maximum shipping request week number, the shipping week (n+1) does not exist, and therefore, the allocation work table 121 for the shipping week (n+1) is not configured. In this regard, according to the judgment in the step 142, the processing proceeds to the step 144 without exception.

In the step 143, the allocation order setting part 116 copies the item name, the production line name, production capacity consumption factor, the destination, the transportation time, and the shipping request week within all the unallocated records, and stores the copied information respectively in the corresponding fields in the allocation work table 121 for the shipping week n. Furthermore, the allocation order setting part 116 copies the unallocated amount in the unallocated record in the allocation worktable 121 associated with the shipping week (n+1), and stores the copied information in the shipping requirement amount field 121*i* and in the unallocated amount field 121*k* in the allocation work table 121 associated with the shipping week n (S143). It is to be noted here that the value stored in the unallocated amount field 121*k* is an initial value of the unallocated amount, and it is changed in the step 162 and in the step 166 described below (FIG. 12). Furthermore, in the processing of the step 143, the record for storing the unallocated data in the allocation work table associated with the shipping week (n+1) into the allocation work table 121 associated with the shipping week n, is in the state as including data in the item name field 121*a*, in the production line name field 121*b*, in the production capacity consumption factor field 121*c*, in the destination field 121*d*, in the transportation time field 121*e*, in the shipping request week number field 121*f*, in the shipping requirement amount field 121*i*, and in the unallocated amount field 121*k*, whereas including no data in the shipping margin time field 121*g*, in the demand certainty field 121*h*, and in the allocation order field 121*j*.

Next, the allocation order setting part 116 extracts all the data for the shipping request week n, from the shipping request information table 132, and stores the data items respectively in the corresponding fields in the allocation work table 121 for the shipping week n (S144). On this occasion, the shipping amount, out of all the data items from the shipping request information table 132 for the shipping request week n, is stored in the shipping requirement amount field 121*i* and in the unallocated amount field 121*k*. It is to be noted here that the value stored in the unallocated amount field 121*k* is an initial value of the unallocated amount, similar to the processing in the step 143, and it is changed in the step 162 and in the step 166 (FIG. 12) as described below. Furthermore, in the processing of the step 144, the record for storing the data of the shipping week n in the allocation work table 121 associated with the shipping week n, is in the state as including data in the item name field 121*a*, in the destination field 121*d*, in the shipping request week number field 121*f*, in the shipping requirement amount field 121*i*, and in the unallocated amount field 121*k*, whereas including no data in the production line name field 121*b*, in the production capacity consumption factor field 121*c*, in the transportation time field 121*e*, in the shipping margin time field 121*g*, in the demand certainty field 121*h*, and in the allocation order field 121*j*.

Next, the allocation order setting part 116 refers to the production line setting table 133 (FIG. 4) based on the item name stored in the item name field 121*a* in the allocation work table 121 for the shipping week n, figures out the production line name and the production capacity consumption factor associated with the item name, and stores the production line name and the production capacity consumption factor in the respectively associated fields 121*b* and 121*c* in the allocation work table 121 for the shipping week n (S145). It is to be noted that in the step 145, the production line name and the production capacity consumption factor are stored, out of the record associated with only the shipping request week n. This is because the production line name and the production capacity consumption factor have already been stored in the record in the allocation work table 121 for the shipping week n, the record being associated with the unallocated data in the allocation work table 121 for the shipping week (n+1).

Next, the allocation order setting part 116 refers to the transportation table 134 (FIG. 5) based on the destination stored in the destination 121*d* of the allocation work table 121 for the shipping week n, figures out a transportation time of the product associated with the destination, and stores the transportation time in the transportation time field 121*e* in the allocation worktable 121 for the shipping week n (S146). It is to be noted that also in the step 146, the transportation time is stored in the record which is associated with the shipping request week n.

Next, the allocation order setting part 116 subtracts the shipping week n from the shipping request week number, so as to obtain a shipping margin time, and stores the shipping margin time in the shipping margin time field 121*g* in the allocation work table 121 for the shipping week n (S146). By way of example, since the shipping request week number in the uppermost record in the allocation work table 121 for the shipping week n shown in FIG. 7 is (n+1), it is calculated that (n+1)−n=1, and the allocation order setting part 116 stores "1 (week)" in the shipping margin time field 121*g* of the record. As indicated by this record, in the case where a product with the shipping request week (n+1) is shipped one week earlier, shipment of the product is performed one week earlier than the shipping request week. Therefore, the shipping margin time for this product is set as one week.

Next, the allocation order setting part 116 obtains demand certainty based on the shipping margin time and the transportation time, and stores the demand certainty in the demand certainty field 121*h* (S148). As to a product in the shipping week n, if the time (shipping margin time+transportation time) is a large value, it means that a projection on the shipping amount of this product is directed to further future shipment, therefore indicating that the demand certainty is low.

On the other hand, when a product has the time (shipping margin time+transportation time) being a small value, it may indicate that the demand certainty is high. In here, the value of time (shipping margin time+transportation time) is assumed as the demand certainty. It is to be noted again that the larger is the value, the demand certainty becomes lower.

Finally, the allocation order setting part 116 allocates natural numbers 1, 2, 3, and so on, sequentially, in descending order starting from a record having the largest demand certainty, and this is assumed as the allocation order and stored in the allocation order field 121*j* (S149). It is to be noted in the case where records having the same demand certainty value exist, it is preferable that a higher order is set to a record having a larger unallocated amount stored in the unallocated amount field 121*k*, or a record having a larger shipping margin time stored in the shipping margin time field 121*g*. By way of example, the demand certainty of the records in the second line and in the third line from the top of the allocation work table 121 for the shipping week n as shown in FIG. 7 indicate "2" in both, and therefore, the record having a larger unallocated amount stored in the unallocated amount field 121*k* out of those records, that is, the record in the second line is assigned a higher order.

This is the end of the allocation order setting process (S140). According to the allocation order determined by the allocation order setting process (S140), a shipping request having lower demand certainty relative to the other shipping requests, is allocated in advance so as to be shipped in the shipping week n.

Next, according to the flowchart as shown in FIG. 12, the aforementioned allocation process (S150) will be explained in detail.

The allocation part 117 of the shipping amount setting part 113 firstly configures on the memory 120, a remaining production capacity table 122 for the shipping week n defined in the step 130 or in the step 180 as shown in FIG. 9 (S151). As shown in FIG. 8, the remaining production capacity table 122 includes the production line name field 122*a* for storing the production line name, a shipping week number field 122*b* for storing the shipping week number, a production capacity field 122*c* for storing the production capacity of the production line, and a remaining production capacity field 122*d* for storing the remaining production capacity of the production line. In order to provide the remaining production capacity table 122, the allocation part 117 refers to the production capacity table 131 (FIG. 2) and stores each production line name scheduled to be activated in the shipping week n, in the production line name field 122*a* of the remaining production capacity table 122, along with storing "n" in the shipping week number field 122*b*. Furthermore, the allocation part 117 refers to the production capacity table 131 (FIG. 2), and stores the production capacity of each production line for the shipping week n in the production capacity field 122*c* and in the remaining production capacity field 122*d* of the remaining production capacity table 122. It is to be noted that a value stored in the remaining production capacity field 122*d* is an initial value of the remaining production capacity and it is changed in the step 163 and in the step 167 as described below.

Next, the allocation part 117 sets "1" to the allocation order X (S152), and determines whether or not a record of this allocation order X can be extracted from the allocation work table 121 (FIG. 7) (S153). When the allocation order X is "1", it is possible to extract the record of this allocation order X, and therefore, the processing proceeds to the step 154 and the record of the allocation order X is extracted (S154).

Next, the allocation part 117 determines from the remaining production capacity table 122 (FIG. 8), whether or not it is possible to extract the remaining production capacity r (>0) relating to the production line of the allocation order X, in other words, whether or not it is possible to extract the production line of the allocation order X, the production line being provided with the remaining production capacity r (S155). In the case where the remaining production capacity r (>0) relating to the production line of the allocation order X is allowed to be extracted, this remaining production capacity r is extracted (S156). On the other hand, in the case where this remaining production capacity is not allowed to be extracted, one is added to the allocation order X, assuming this is a new allocation order X (S164), and then processing returns to the step 153.

The allocation part 177 extracts the remaining production capacity r (S156), and subsequently acquires from the allocation work table 121, a production capacity consumption factor c and unallocated amount a in the record of the allocation order X (S157).

Next, the allocation part 117 subtracts a value obtained by multiplying the unallocated amount a by the production capacity consumption factor c, from the remaining production capacity r (S158), and determines whether or not this value R is equal to or more than zero (S159). The remaining production capacity r is a value indicating how many more products of the aforementioned reference items can be produced. Therefore, in the step 158, the unallocated amount a is multiplied by the production capacity consumption factor c, and converts the unallocated amount a into the unallocated amount of the product being the reference item. Then, the unallocated amount is subtracted from the remaining production capacity r, thereby obtaining the remaining production capacity R for the case where the entire unallocated amount is produced.

In the step 159, even when it is determined that the remaining new production capacity R≧0, i.e., even after the entire unallocated amount has been produced, it is also determined that this is in the range of the production capacity in the pertinent production line, it is possible to say that the entire unallocated amount can be produced. Therefore, in the step 161, the allocation part 117 generates a record for the allocation order X in the allocation result table 135 (FIG. 6), and registers the unallocated amount a, as it is, in the allocated amount field 135*i* within the record. The allocation part 117 further registers the production line name, the destination, the transportation time, the shipping request week number, the shipping margin time, and the demand certainty in the record of the allocation order X in the allocation work table 121 (FIG. 7), in the respective fields 135*a* to 135*g* in the record of the allocation order X in the allocation result table 135 (FIG. 6). In addition, the allocation part 117 registers the shipping week n in the shipping week number field 135*h* in the allocation result table 135.

Subsequently, the allocation part 117 changes to zero, the value in the unallocated amount field 121*k* in the record of the allocation order X in the allocation work table 121 (FIG. 7) (S162), and simultaneously changes the value r of the remaining production capacity field 122*d* of the production line in the remaining production capacity table 122, to the new remaining production capacity R that is obtained in the step 158 (S163).

Next, one is added to the allocation order X, assuming this value as a new allocation order X (S164), and then the processing returns to the step 153. Then, the allocation part 117 repeats the processing from the step 153 to the step 164 until it is determined that R≧0 is false in the step 158.

In the course of repeating the processing from the step 153 to the step 164, if it is determined that the new remaining production capacity R≧0 is false in the step 159, that is, the production amount goes over the production capacity in the production line if the entire unallocated amount is tried to be produced. This means that it is not possible to produce the entire unallocated amount in the production line. Therefore, in the step 165, the allocation part 117 generates a record of this allocation order X in the allocation result table 135 (FIG. 6), and registers as an allocated amount, a value obtained by dividing the remaining production capacity r by the production capacity consumption factor c, in the allocated amount field 135i of this record. An amount allocatable to the production line in the shipping week n, out of the unallocated amount for the allocation order X, corresponds to the remaining production capacity r of the production line. As discussed above, the remaining production capacity r is a value indicating how many more products of reference items can be produced in the production line. Therefore, in the step 165, the remaining production capacity r is divided by the production capacity consumption factor c, converting the remaining production capacity r for the reference item product into the remaining production capacity of the product, and this value is assumed as an allocated amount in the production line for the product. Furthermore, the production line name, the destination, the transportation time, the shipping request week number, the shipping margin time, and the demand certainty in the record of the allocation order X in the allocation work table 121 FIG. 7, are registered in the respective fields 135a to 135g in the record of the allocation order X in the allocation result table 135 (FIG. 6). In addition, the shipping week n is registered in the shipping week number field 135h of the allocation result table 135.

Subsequently, the allocation part 117 changes the unallocated amount field 121k in the record of the allocation order X in the allocation work table 121 (FIG. 7) to (−) a value obtained by dividing new remaining production capacity R by the production capacity consumption factor c (S166). In the step 159, if it is determined that the production amount goes over the production capacity in the production line if the entire unallocated amount is tried to be produced, the new remaining production capacity R (<0) obtained in the step 158 corresponds to the amount exceeding the production capacity of the production line. Therefore, the remaining production capacity R (<0) is divided by the production capacity consumption factor c, to change the remaining production capacity R of the reference item product to the remaining production capacity of the product, and this value is assumed as the unallocated amount.

Next, the allocation part 117 changes to zero, the value of the remaining production capacity field 122d of the production line in the remaining production capacity table 122 (S167). Then, one is added to the allocation order X, assuming it as a new allocation order X (S164), and the processing returns to the step 153.

In the step 153, the allocation part 117 determines whether or not it is possible to extract from the allocation work table 121, a record of the new allocation order X that is changed in the step 164. In the case where a record of the new allocation order X cannot be extracted from the allocation work table 121, it is assumed that the processing for all the shipping requests to which the allocation order is assigned in the previous allocation order setting process (140) is completed, and then, the allocation process (S150) is terminated. On the other hand, in the case where a record of the new allocation order X can be extracted from the allocation work table 121, the processing in the aforementioned step 155 is performed after going through the step 154 described above.

If the processing goes through the aforementioned step 165 to the step 167 before going through the processing of the step 155, the remaining production capacity r relating to the production line becomes zero. Therefore, in the step 155, it is not possible to extract the remaining production capacity r (>0) of the allocation order X relating to the production line, and the processing proceeds to the step 164, adding one to the allocation order X, assuming it as a new allocation order X, and then, the processing again returns to the step 153. In other words, even when there exists any shipping request that has not been allocated to the shipping week n in the allocation work table 121, the remaining production capacity r relating to the production line is zero and no more production is possible in the shipping week n. Therefore, the shipping request that has not been allocated to the shipping week n is kept unallocated, being left in the allocation work table 121 for the shipping week n, and this shipping request is made to be allocated in the allocation process (S150) for the shipping week (n−1) and subsequent thereto.

Here, taking as an example the allocation work table 121 for the shipping week n shown in FIG. 7, a specific allocation process (S150) will be explained.

By way of example, in the allocation work table 121 for the shipping week n, the allocation order "1" is associated with a shipping request of the item name "AAA", the destination "Y", and the shipping request week "n", the allocation order "2" is associated with a shipping request of the item name "BBB", the destination "Y", and the shipping request week "n", the allocation order "3" is associated with a shipping request of the item name "BBB", the destination "X", and the shipping request week "n+1", the allocation order "4" is associated with a shipping request of the item name "BBB", the destination "X", and the shipping request week "n", and the allocation order "5" is associated with a shipping request of the item name "AAA", the destination "X", and the shipping request week "n". Here, it is assumed that the production capacity of the production line "L1" for the shipping week n is "1300".

Figure 15:
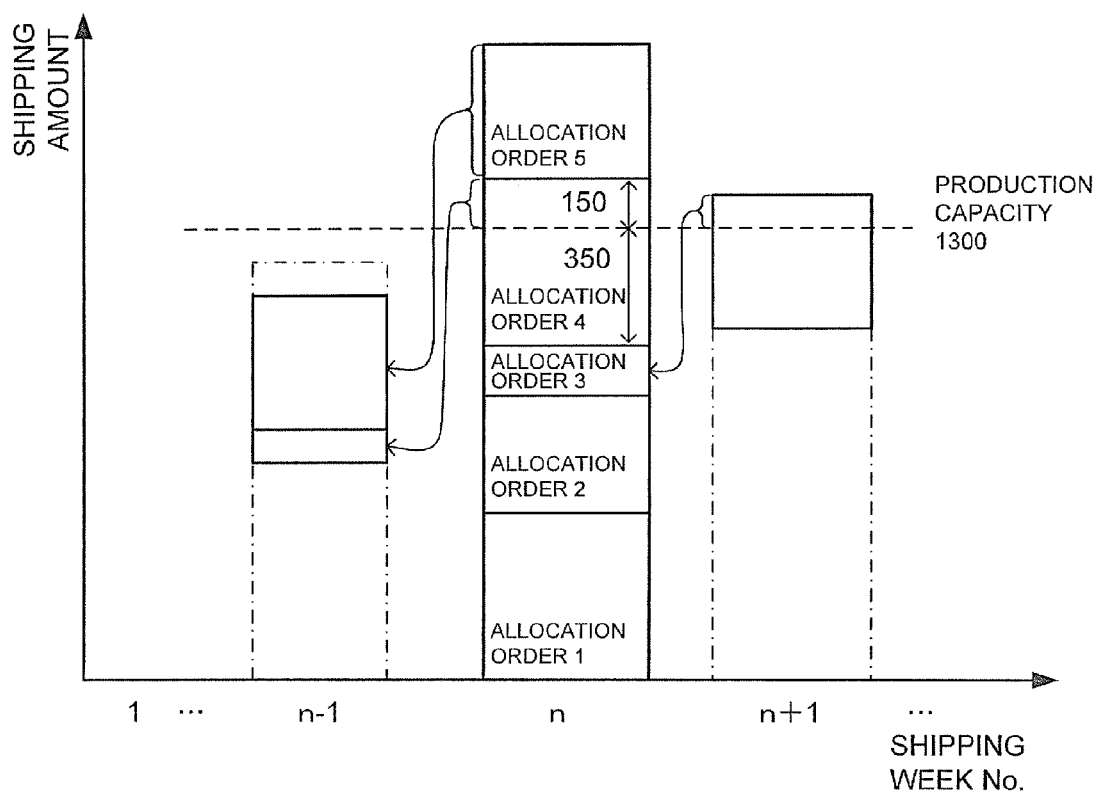
FIG. 15 illustrates a method for allocating each shipping request in the shipping week n, in one embodiment relating to the present invention.

Among the shipping requests as described above, if the shipping requests associated with from the allocation orders "1" to "3" are subjected to the allocation in the shipping week n, as shown in FIG. 15, the sum of each shipping requirement of the allocation orders "1" to "3" for the shipping week n is 950 (=500+350+100), being not more than "1300" which is the production capacity of the production line "L1" for the shipping week n. Therefore, the shipping requests associated with from the allocation orders "1" to "3" are allowed to be allocated to the shipping week n, and here, the entire unallocated amount in the shipping requests associated with the allocation orders "1" to "3" are allocated to the shipping week n.

Specifically, as to each of the shipping requests respectively associated with the allocation orders "1" to "3", the allocation part 117 determines that R≧0 in the step 159, and registers the unallocated amount a in the allocated amount field 135i in the allocation result table 135 (FIG. 6) in the step 161. Here, the unallocated amount "500" is registered in the allocated amount field 135i in the allocation result table 135, for the shipping request associated with the allocation order "1", the item name "AAA", the destination "Y", the shipping request week "n", and the unallocated amount "500" in the allocation work table 121 for the shipping week n. In addition, the unallocated amount "500" is registered in the allocated amount field 135i in the allocation result table 135, for the shipping request associated with the allocation order "2", the item name "BBB", the destination "Y", the unallocated amount "350", and the shipping request week "n" in the allocation worktable 121 for the shipping week n. Furthermore, the unallocated amount "100" is registered in the allocated amount field 135$i$ in the allocation result table 135, for the shipping request associated with the allocation order "3", the item name "BBB", the destination "X", the unallocated amount "100", and the shipping request week "n+1" in the allocation work table 121 for the shipping week n.

In the step 162, the allocation part 117 changes to zero, the unallocated amount associated with each of the allocation orders "1", "2", and "3" in the allocation work table 121 for the shipping week n.

Furthermore, in the step 163, the allocation part 117 changes the remaining production capacity r of the production line in the remaining production capacity table 122 for the shipping week n, to the new remaining production capacity R (350=1300−500×1−350×−100×1), which is obtained in the step 158.

After the allocation of the shipping requests associated with the allocation orders "1" to "3" is completed, the allocation processing for the shipping request associated with the allocation order "4" is performed. However, as shown in FIG. 15, in the case where the shipping request associated with the allocation order "4" is tried to be allocated to the shipping week n, if the entire shipment requirement (500) of this shipping request is allocated to the shipping week n, this causes an excess of 150 over the production capacity (1300) of the production line for the shipping week n. In the present embodiment, the portion of 350 out of the shipment requirement (500) of this shipping request is allocated to the shipping week n, and an excess of 150 over the production capacity (1300) of the production line is assumed as unallocated amount and shipped on or before the shipping week (n−1).

Specifically, as for the shipping request associated with the allocation order "4", in the step 159, the allocation part 117 determines that R≧0 is false, that is, it is not possible to produce the entire unallocated amount in the production line, and in the step 165, the allocation part 117 registers as the allocated amount in the allocated amount field 135$i$ of the allocation result table 135 (FIG. 6), the amount corresponding to the remaining production capacity of the production line, that is, a value (350=350/1) obtained by dividing the remaining production capacity r of the production line (=350) by the production capacity consumption factor c (=1).

In addition, in the step 166, the allocation part 117 changes the unallocated amount for the allocation order "4" in the allocation work table 121 for the shipping week n, to a value (150=−(−150)/1) obtained by dividing (−) new remaining production capacity R (=−150) by the production capacity consumption factor c (=1).

Furthermore, the allocation part 117 changes to zero, the remaining production capacity r of the production line in the remaining production capacity table 122 for the shipping week n, in the step 167.

When the allocation process is completed for the shipping request associated with the allocation order "4", the allocation process for the shipping request associated with the allocation order "5" is performed. However, as shown in FIG. 15, on the stage of allocating the shipping request associated with the allocation order "4", the production capacity of the production line for the shipping week n has already been exceeded, and therefore, it is not possible to allocate the shipping request associated with the allocation order "5". For this case, on the stage of allocating the shipping request associated with the allocation order "4", the remaining production capacity r of the production line is zero. Therefore, the allocation part 117 is not allowed to extract the remaining production capacity r (>0) relating to the production line associated with the allocation order "5" in the step 155, and the processing proceeds to the step 164. Then, one is added to the allocation order "5", rendering it as a new allocation order "6", and thereafter the processing returns to the step 153. In other words, as described above, even when there is a shipping request that has not been allocated to the shipping week n in the allocation work table 121, if the remaining production capacity r relating to this production line is zero and no more production is allowed in this shipping week n, the shipping request associated with the allocation order "5" is left in the allocation work table 121 for the shipping week n, and it is scheduled to be allocated in the allocation process for the shipping week (n−1) and subsequent process (S150).

As thus described, in the present embodiment, as for the shipping request with a lower allocation order, that is, a shipping request with higher demand certainty, a shipping week is determined at a later processing stage as possible. In other words, the shipping week is brought forward. Relatively, as for the shipping request with lower demand certainty, the shipping week is determined to be a later week.

When the new allocation order "6" is set, and the processing returns to the step 153, the record of this new allocation order "6" does not exist in the allocation work table 121 for the shipping week n. Therefore, the allocation process for the shipping week n is terminated.

As discussed above, with reference to the flowchart shown in FIG. 9, the processes in the steps 140, 150, 170, and 180 including the aforementioned allocation process (S150), are repeated until the value of the shipping week n becomes zero. When the value of the shipping week becomes zero, the I/O controller 111 generates a production plan based on the allocation result table 135, and displays the production plan screen 148 on the display unit 141 (S190). This production plan screen 148 shows the production plan in a table format, including a production line name field 148$a$ indicating the production line name, an item name field 148$b$ indicating the item name of the product manufactured in the production line, and shipping amount fields 148$c$ indicating the product shipping amount of the item in the production line for each week, from the first week to the maximum shipping request week (the 24th week).

As thus described, in the present embodiment, demand certainty is determined based on the transportation time, and the like, for each shipping request, and the allocation order of the request with low demand certainty is made higher, whereas for the request with high demand certainty, the allocation order is made lower. Then, in the present embodiment, as for the shipping request with a low allocation order, the shipping week is determined at a later processing stage as possible, in other words, as for the shipping request with higher demand certainty, the shipping week is brought forward. Relatively, as for the shipping request with lower demand certainty, the shipping week is defined as a later week. Consequently, the shipping request with high demand certainty is subjected to production ahead of time with reliability, whereas for the shipping request with low demand certainty, the production is postponed. Therefore, it is possible to prevent the probability of surplus stock occurrence.

In the present embodiment as described above, the allocation order for the shipping week n is determined, then, the allocation process (S150) to allocate the shipping request in this shipping week n is performed, and at this timing, the remaining production capacity table 122 for the shipping week n is configured. However, the remaining production capacity table for each shipping week may be configured before starting the allocation process (S150), after accepting the production capacity of each production line. Further in the description above, after accepting the production capacity of each production line and configuring the production capacity table 131, the remaining production capacity table is provided. However, at the stage of accepting the production capacity of each production line, it is possible to immediately provide the remaining production capacity table for each shipping week, without configuring the production capacity table 131.

DENOTATION OF REFERENCE NUMERALS

100: PRODUCTION PLAN MAKING DEVICE
110: CPU
111: I/O CONTROLLER
112: MAXIMUM SHIPPING REQUEST WEEK SPECIFYING PART
113: SHIPPING AMOUNT SETTING PART
114: SHIPPING AMOUNT SETTING CONTROLLER
115: ORDER SETTING TIME CALCULATION PART
116: ALLOCATION ORDER SETTING PART
117: ALLOCATION PART
120: MEMORY
121: ALLOCATION WORK TABLE
122: REMAINING PRODUCTION CAPACITY TABLE
130: STORAGE UNIT
131: PRODUCTION CAPACITY TABLE
132: SHIPPING REQUEST INFORMATION TABLE
133: PRODUCTION LINE SETTING TABLE
134: TRANSPORTATION TIME TABLE
135: ALLOCATION RESULT TABLE
136: PRODUCTION PLAN MAKING PROGRAM
140: I/O INTERFACE
141: DISPLAY UNIT
142: INPUT UNIT
150: COMMUNICATION UNIT

What is claimed is:

1. A non-transitory computer readable medium storing a production plan making program for determining in which unit period (hereinafter, referred to as a shipping period) a product is shipped, in response to a shipping request indicating a requested shipping amount for each unit period (hereinafter, referred to as a shipping request period) of the product from each destination, the program, upon execution by a computer, causing the computer to perform a method comprising:

accepting via a means for input of the computer, the shipping request of the product from each of the destinations, production capacity of the product in the unit period, and a product transportation time to the destination with respect to each destination, and storing the accepted data in a means for storage of the computer, specifying the furthest future shipping request period, out of the shipping request periods of the shipping requests stored in the means for storage, assigning the furthest future shipping request period as the furthest future shipping period, and determining a shipping amount for each shipping period starting from the shipping amount in the furthest future shipping period, followed by determining the shipping amount in the shipping periods each sequentially approaching the current time, and allowing a means for output of the computer to output the shipping amount for each shipping period, wherein, each iteration of determining a shipping amount for a shipping period comprises:

in the shipping period targeted for setting the shipping amount, determining an order setting time indicating a time from the shipping period until the time by which the product is to be delivered to the destination, referring to the product transportation time to each destination stored in the means for storage, as to each shipping request from the destination awaiting shipment, among the shipping requests wherein shipping request period is in the shipping period or later than the shipping period, determining the allocation order of each shipping request awaiting shipment based on the corresponding determined order setting time for each shipping request awaiting shipment, in such a manner that the shipping request having a longer order setting time is provided with a higher allocation order, and allocating to the shipping period, a requested shipping amount for each shipping request awaiting shipment, until reaching the production capacity of the product in the shipping period, according to the determined allocation order of each shipping request awaiting shipment, and assigning any portion exceeding the production capacity in the shipping period as a portion awaiting shipment.

2. The non-transitory computer readable medium according to claim 1, wherein, the order setting time corresponds to the product transportation time, if the shipping period as a target for setting the shipping amount is equal to the shipping request period, and if the shipping request period is later than the shipping period, the time corresponds to the sum of: a difference between the shipping request period and the shipping period, and the product transportation time.

3. The non-transitory computer readable medium according to either claim 1 or claim 2, wherein the method further comprises:

accepting the shipping request with respect to each destination and each product type and storing the shipping request in the means for storage, simultaneously accepting the production capacity of a reference product in the unit period at a production facility and storing the production capacity of the reference product in the means for storage, and further accepting a production capacity consumption factor for each product type, the factor being a ratio between a production amount of a product of the product type at the production facility in the unit period, and the production capacity being the production amount when the reference product is produced at the production facility in the unit period, and storing in the means for storage, the production capacity consumption factor for each product type, and when the requested shipping amount for each shipping request awaiting shipment is sequentially allocated to the shipping period, allocating the requested shipping amount for each shipping request awaiting shipment by using the requested shipping amount for the product type indicated by the shipping request and the production capacity consumption factor of the product type, converting the requested shipping amount into a value on the reference product base, and assigning a total of the values on the reference product base converted from each requested shipping amount, as the aggregate allocated shipping amount in the shipping period.

4. A production plan making device for determining in which unit period (hereinafter, referred to as a shipping period) a product is shipped, in response to a shipping request indicating a requested shipping amount for each unit period (hereinafter, referred to as a shipping request period) of the product from each destination, the device comprising:

- a data accepting means for accepting the shipping request of the product from each of the destinations, production capacity of the product in the unit period, and a product transportation time to the destination with respect to each destination,
- a storing means for storing the accepted data,
- a period specifying means for specifying the furthest future shipping request period, out of the shipping request periods of the shipping requests stored in the storage means,
- a shipping amount setting means for assigning the furthest future shipping request period as the furthest future shipping period, and determining a shipping amount for each shipping period starting from the shipping amount in the furthest future shipping period, followed by determining the shipping amount in the shipping periods each sequentially approaching the current time, and
- an outputting means for outputting the shipping amount for each shipping period, determined by the shipping amount setting means, wherein,
- the shipping amount setting means comprises:
  - in the shipping period targeted for setting the shipping amount, an order setting time calculation means for determining an order setting time indicating a time from the shipping period until the time by which the product is to be delivered to the destination, referring to the product transportation time to each destination stored in the storage means, as to each shipping request from the destination awaiting shipment, among the shipping requests wherein shipping request period is in the shipping period or later than the shipping period,
  - an allocation order setting means which refers to the order setting time as to each shipping request awaiting shipment, the time being obtained in the order setting time calculation means, and determines the allocation order of each shipping request awaiting shipment, in such a manner that the shipping request having a longer order setting time is provided with a higher allocation order, and
  - an allocation means for allocating to the shipping period, a requested shipping amount for each shipping request awaiting shipment, until reaching the production capacity of the product in the shipping period, according to the allocation order determined in the allocation order setting means, and assigning any portion exceeding the production capacity in the shipping period as a portion awaiting shipment.

5. A production plan making method for determining by a computer in which unit period (hereinafter, referred to as a shipping period) a product is shipped, in response to a shipping request indicating a requested shipping amount for each unit period (hereinafter, referred to as a shipping request period) of the product from each destination, the method comprising:

- accepting via a means for input of the computer, the shipping request of the product from each of the destinations, production capacity of the product in the unit period, and a product transportation time to the destination with respect to each destination, and storing the accepted data in a means for storage of the computer,
- specifying the furthest future shipping request period, out of the shipping request periods of the shipping requests stored in the means for storage,
- assigning the furthest future shipping request period as the furthest future shipping period, and determining a shipping amount for each shipping period starting from the shipping amount in the furthest future shipping period, followed by determining the shipping amount in the shipping periods each sequentially approaching the current time, and
- allowing a means for output of the computer to output the shipping amount for each shipping period, wherein,
- each iteration of determining a shipping amount for a shipping period comprises:
  - in the shipping period targeted for setting the shipping amount, determining an order setting time indicating a time from the shipping period until the time by which the product is to be delivered to the destination, referring to the product transportation time to each destination stored in the means for storage, as to each shipping request from the destination awaiting shipment, among the shipping requests wherein shipping request period is in the shipping period or later than the shipping period,
  - determining, by the computer, the allocation order of each shipping request awaiting shipment based on the corresponding determined order setting time for each shipping request awaiting shipment, in such a manner that the shipping request having a longer order setting time is provided with a higher allocation order, and
  - allocating, by the computer, to the shipping period, a requested shipping amount for each shipping request awaiting shipment, until reaching the production capacity of the product in the shipping period, according to the determined allocation order of each shipping request awaiting shipment, and assigning any portion exceeding the production capacity in the shipping period as a portion awaiting shipment.

* * * * *